(12) United States Patent
Zhang

(10) Patent No.: US 10,852,043 B2
(45) Date of Patent: Dec. 1, 2020

(54) DC VARAIABLE SPEED COMPRESSOR CONTROL METHOD AND CONTROL SYSTEM

(71) Applicant: ECOER INC., McLean, VA (US)

(72) Inventor: Jianliang Zhang, Beijing (CN)

( * ) Notice: Subject to any disclaimer, the term of this patent is extended or adjusted under 35 U.S.C. 154(b) by 0 days.

(21) Appl. No.: 16/346,146

(22) PCT Filed: Nov. 4, 2016

(86) PCT No.: PCT/US2016/060502
§ 371 (c)(1),
(2) Date: Apr. 30, 2019

(87) PCT Pub. No.: WO2018/084849
PCT Pub. Date: May 11, 2018

(65) Prior Publication Data
US 2019/0338994 A1     Nov. 7, 2019

(51) Int. Cl.
| *F24F 11/46* | (2018.01) |
| *F24F 11/61* | (2018.01) |
| *F24F 11/64* | (2018.01) |
| *F25B 49/02* | (2006.01) |
| *F24F 11/65* | (2018.01) |
| *F24F 140/50* | (2018.01) |
| *F24F 110/10* | (2018.01) |

(52) U.S. Cl.
CPC ............ *F25B 49/022* (2013.01); *F24F 11/46* (2018.01); *F24F 11/61* (2018.01); *F24F 11/64* (2018.01); *F24F 11/65* (2018.01); *F24F 2110/10* (2018.01); *F24F 2140/50* (2018.01); *F25B 2500/19* (2013.01); *F25B 2600/01* (2013.01); *F25B 2600/0251* (2013.01); *F25B 2600/0253* (2013.01); *F25B 2600/23* (2013.01)

(58) Field of Classification Search
CPC .. F24F 11/46; F24F 11/61; F24F 11/63; F24F 11/64; F24F 11/65; F24F 2110/10; F24F 2140/50; F25B 2500/19; F25B 2600/01; F25B 2600/0251; F25B 2600/0253; F25B 2600/23; F25B 49/022; Y02B 30/741
See application file for complete search history.

(56) References Cited

U.S. PATENT DOCUMENTS

| 8,280,556 B2* | 10/2012 | Besore | G05B 15/02 165/11.1 |
| 8,756,947 B2* | 6/2014 | Chen | F25B 1/10 62/117 |
| 9,958,192 B2* | 5/2018 | Park | F25B 49/022 |
| 2008/0052040 A1* | 2/2008 | Renner | G05B 21/02 702/182 |
| 2010/0263393 A1* | 10/2010 | Chen | F25D 29/003 62/115 |
| 2011/0153090 A1* | 6/2011 | Besore | G05B 15/02 700/278 |
| 2013/0025304 A1* | 1/2013 | Dorman | F25B 49/022 62/115 |
| 2015/0121925 A1* | 5/2015 | Park | F25B 27/00 62/151 |

* cited by examiner

*Primary Examiner* — Abdelmoniem I Elamin
(74) *Attorney, Agent, or Firm* — John Ye

(57) ABSTRACT

The present disclosure relates to the field of air conditioning technology. In particular, it involves a control method and control device based on a DC variable speed AC compressor.

16 Claims, 4 Drawing Sheets

DC VARAIABLE SPEED COMPRESSOR CONTROL METHOD AND CONTROL SYSTEM

BACKGROUND OF THE DISCLOSURE

The present application is a national stage of PCT/US16/60502, filed on Nov. 4, 2016, with its specification incorporated by reference, but otherwise the same. The disclosure below will assume common knowledge of air conditioning and heat pump as well as their heat exchange principle in terms of achieving cooling and heating as well as DC inverter technology in varying compressor speed. Therefore, when discussing particular AC inner working, it is applied to heat pump collectively. The discussion will also treat compressor speed and compressor RPS (rotation per second) interchangeably as well.

With the development of air-conditioning technology, DC variable speed air conditioner is becoming mainstream product because it is energy efficient, low noise and good thermostatic, etc. DC variable speed AC can adjust the speed freely, therefore lower the number of on/off cycle, and achieve comfort and energy saving. But the variable speed AC in the current market provides their implementation only based on the basic matching principle—i.e. matching the current output to the current load, in order to lower the number of on/off cycle. When DC variable speed AC is concerned, a duration is defined as from starting the compressor at starting temperature, until stopping the compressor at stopping temperature. Within this duration time, as the temperature changes from the starting temperature to the stopping temperature, the temperature curve changes depending on how the speed control is implemented. Even assuming that the same starting temperature, stopping temperature and duration means the same cooling/heating experience to users, but in terms of energy consumption, each temperature curve represent a different profile. As indicated, the current variable speed AC implementation does not factor in energy consumption. Much missing particularly is a method to estimate the energy consumption in temperature curve profiles so to choose a speed control strategy based on matching a particular profile.

SUMMARY OF THE DISCLOSURE

Based on the above deficiencies, an objective of the disclosure is to provide a new speed control method implementation, so that this new implementation will be able to estimate energy consumption in order to change to an optimal control policy. Another aspect of the new implementation is to change the speed control strategy in respond to peak energy consumption period, so that the energy consumption during peak period will be lowered, which leads to lowest energy consumption.

To achieve the above technical objectives, the present disclosure provides a control system for DC speed control AC compressor, comprises of: a speed control calculation unit, a data storage unit, an information acquisition unit, a network communication module and a speed control output unit.

As the speed control calculation unit, it is for determining the timing on outside peak temperature, and based on that timing, determining the operation cycle status at that timing. Further, the speed control calculation unit is for determining the timing change of the operation cycle preceding the peak temperature, when needed, so that this preceding operation cycle stops at the timing of the peak temperature.

As the data storage unit, it is for storing data used by the speed control calculation unit, including lookup data for indoor temperature and outdoor temperature for a given compressor-off duration time1.

As the information acquisition unit, it is for collecting thermostat setting and outdoor temperature.

As the network communication module, it is for receiving from remote server the weather forecast, obtain temperature curve for the environment.

As the output speed control unit, it is for setting the AC speed based on the calculated value from the speed control calculation unit, namely the compressor-on timing duration. This control method would coincide the compressor-off timing with the peak environment temperature timing.

To achieve the aforementioned technical objectives, a new DC variable speed control method in the present disclosure comprises:

a. receiving the outdoor temperature curve;
b. based on the temperature curve, compressor-off duration time1 and compressor-on duration time2, determining the compressor operation status at the timing of peak temperature, and further based on the peak temperature timing and the operation cycle timing that precedes it, modifying that operation cycle's compressor-on time2 timing;
c. calculating lengthened compressor-on value X for the duration time2, so that time2 ends at the timing of peak temperature;
d. calculating shortened compressor-on value Y for the duration time2, so that time2 ends at the timing of peak temperature;
e. comparing the value X and value Y, if X≤Y, then lengthen the compressor-on timing time2 as time2+X, or if X>Y, then shorten the compressor-on timing time2 as time2−Y; and
f. after the peak temperature passes, restoring the normal compressor-on time2.

Definition

FIG. 1 shows an AC compressor operation cycle in this disclosure, defining $T_{on}$ as the room temperature at the time of the on signal is given by the indoor unit or the thermostat. Also defined is $T_{off}$ which is the room temperature at the time of the off signal given by the indoor unit or the thermostat. Continuing on, $t_0$ is defined as the time when the prior AC compressor-off signal is given, $t_1$ is defined as the starting time of this AC compressor cycle and $t_2$ is defined as the stopping time of this AC compressor cycle. Continuing on, period from $t_0$ to $t_2$ is the defined as time0 (i.e. a DC variable speed compressor operation cycle), from $t_0$ to $t_1$ is the defined as time1 (i.e. compressor-off duration), from $t_1$ to $t_2$ is the defined as time2 (i.e. duration for compressor to be on). If time2 is shorter, it means greater the load to handle, and greater the corresponding output. Negatively, the electrical consumption is also greater. Therefore, setting of time2 period can be set according to user's cooling/heating performance demand or energy-saving preference. But it can also be set by a remote server. The present disclosure assumes that time2 has been known by the time to perform speed control.

FIG. 2 shows a diagram of the temperature curve, as well as conventional compressor running cycle. Regarding the variable speed compressor, because for each cycle, the compressor-on temperature and compressor-off temperature are the same, therefore, given a particular outdoor temperature, the same indoor load is expected for each cycle. When the outdoor temperature is at its peak, the less time the compressor is run during this period, the less electric consumption is needed. The present disclosure embodies this technical implementation, by adjusting the variable speed compressor operating cycle, so that by the time the peak temperature arrives, the compressor has already cooled the inside for it to be turned off, therefore avoiding the negative consequences for running the compressor at peak period.

Timing Explanation for Time1

In the present disclosure, for each time1 of the duration for the variable compressor-off, the system collects the outdoor temperature and the thermostat setting information. Assuming at each indoor/outdoor temperature, the heat gain/heat loss coefficient is the same for a particular building, therefore, time1 can be expressed as a function of f(outdoor temp, indoor temp). By collecting multiple time1 observations and their inputs, one can build a time1=f (outdoor temp, indoor temp) database.

DESCRIPTION OF DISCLOSURE

Embodiment

Figure 1:
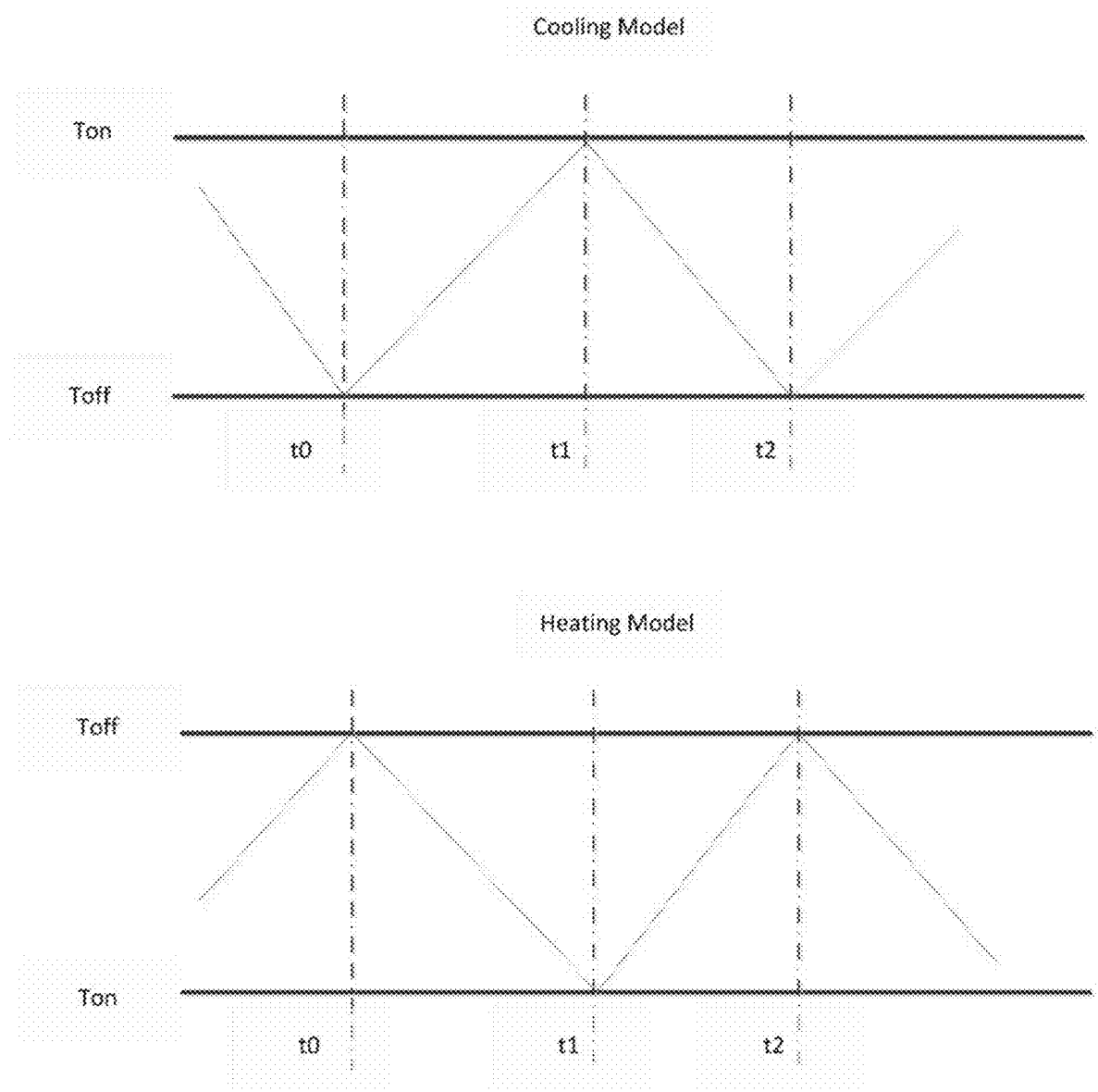
FIG. 1 shows an AC compressor operation cycle of this disclosure.
Figure 2:
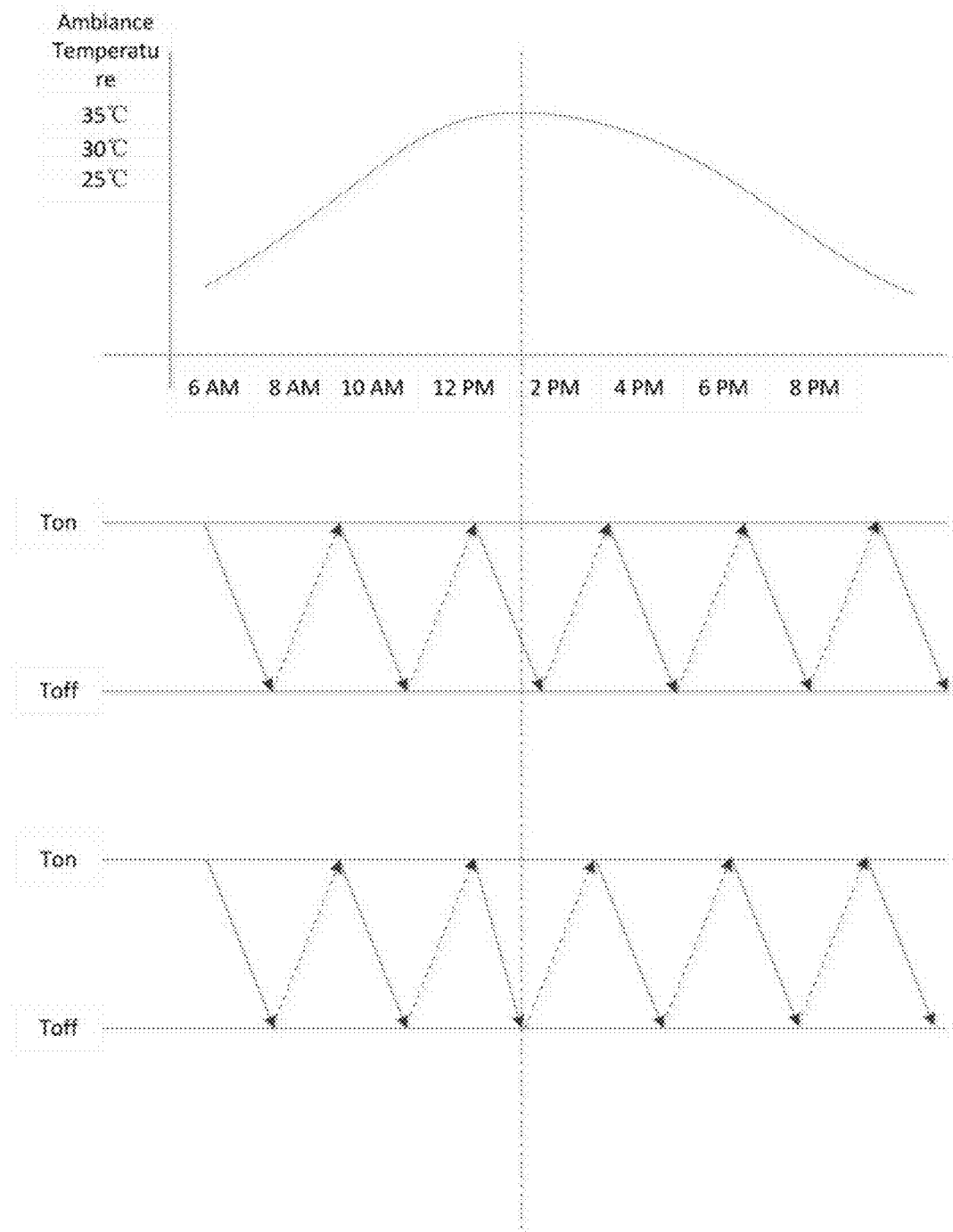
FIG. 2 shows a temperature curve and the compressor operating cycle before and after the adjustment.
Figure 3:
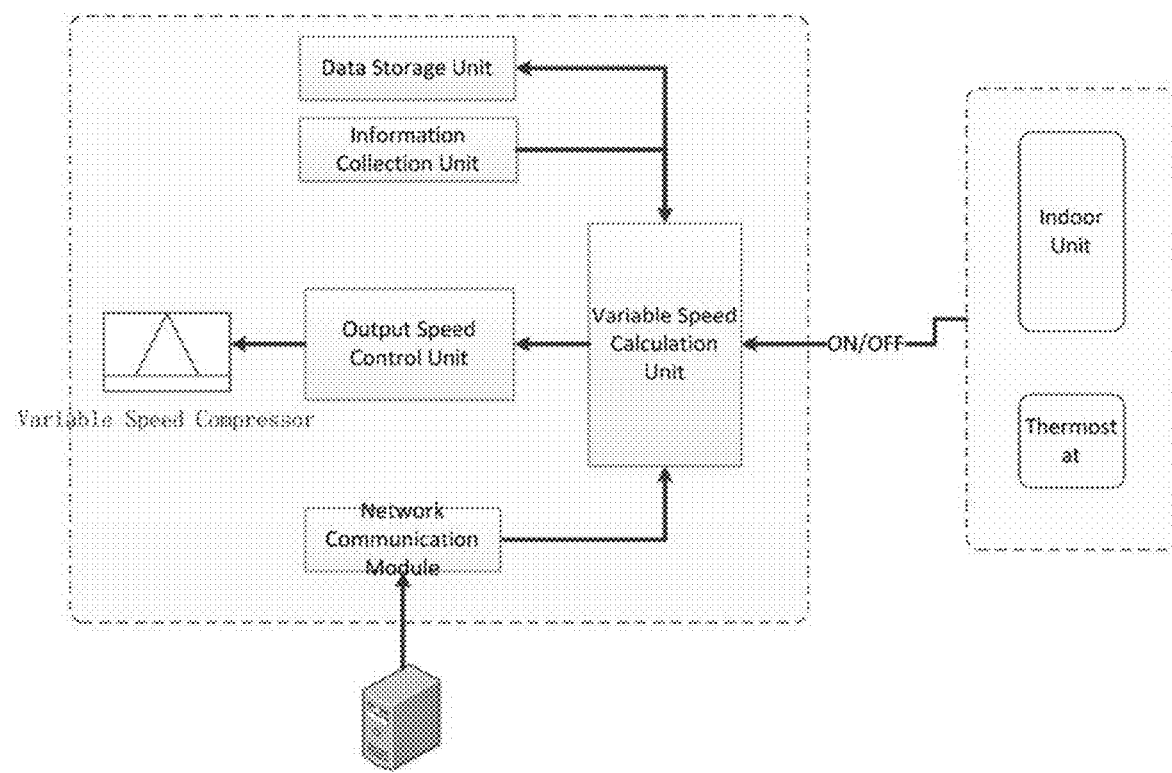
FIG. 3 shows a configuration diagram of the disclosed embodiment on how the new variable AC control unit fits into the overall AC system implementation.

FIG. 3 is the variable speed AC control system configuration diagram of the first embodiment, comprises: speed control calculation unit 10, database unit 20, information acquisition unit 30, network communication module 40 and output speed control unit 50, wherein
the speed control calculation unit 10 is for determining the timing on outside peak temperature, and based on that timing, determining the operation cycle status at that timing, so that when detecting compressor is not off by that time, determining the necessary timing change to the preceding operation cycle of time2; and
the database unit 20 is for storing and providing outdoor temperature and thermostat setting information related to a given compressor-off duration; and
the information acquisition unit 30 is for collecting thermostat setting and outdoor temperature; and
the network communication unit 40 is used to get weather forecasts results from a remote server, and to obtain in advance the outdoor temperature curve; and
the output speed control unit 50 is for setting the AC speed based on the calculated value from the speed control calculation unit, namely the compressor-on timing duration so that the compressor-off timing coincide with the peak environment temperature timing.

Variable Speed Compressor Speed Control Method

Figure 4:
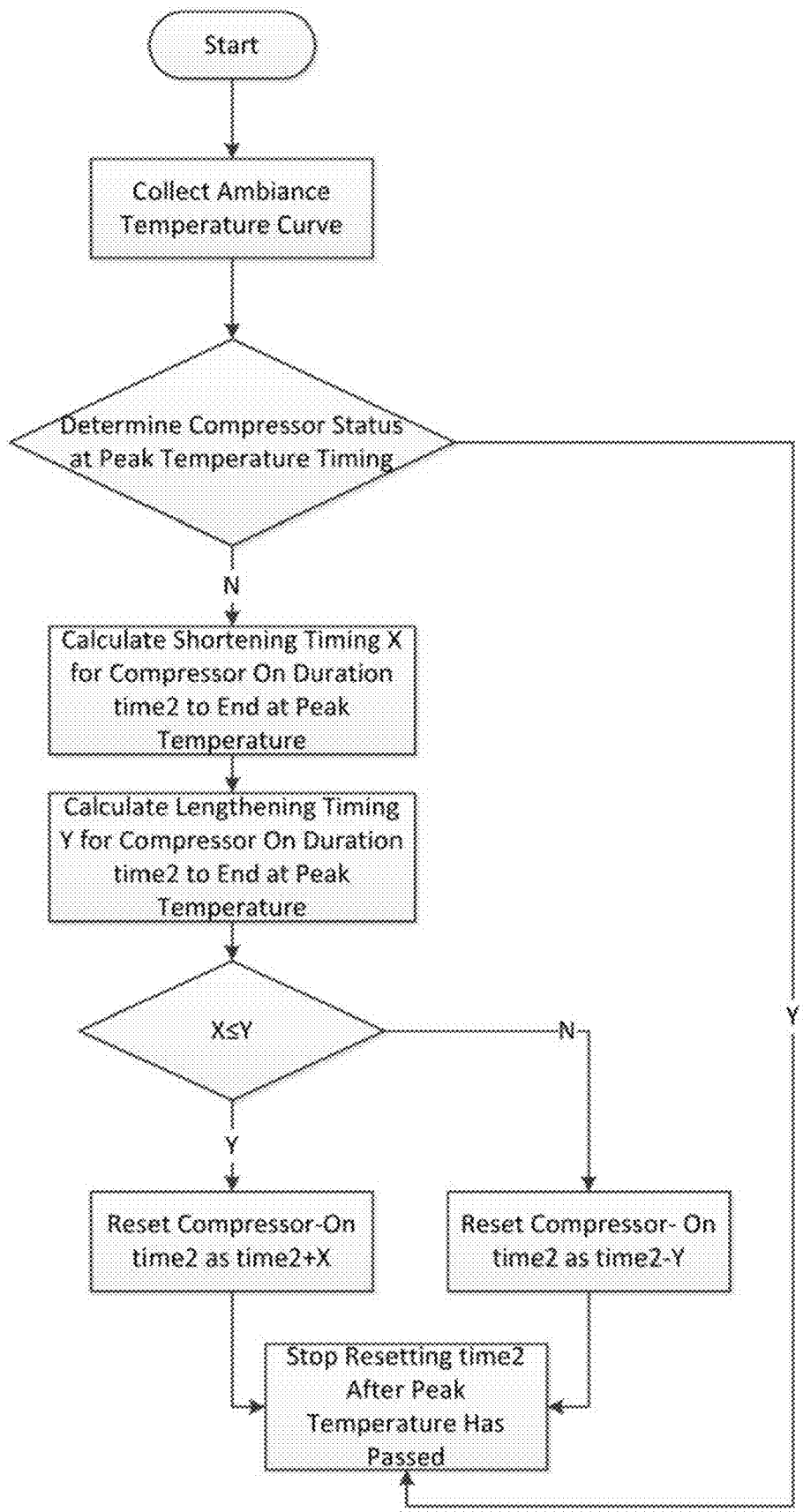
FIG. 4 shows a flowchart of the disclosed embodiment, on how to adjust the compressor-on duration.

As FIG. 4 shows, in this embodiment, the variable speed AC compressor control method comprises:
a. receiving the outdoor temperature curve;
b. based on the temperature curve, compressor-off duration time1 as well as compressor-on duration time2, determining the compressor operation status at the timing of peak temperature, so that when it is not off, further based on the peak temperature timing and the operation cycle timing that precedes it, modifying that operation cycle's compressor-on time2 timing;
c. calculating lengthened compressor-on value X for the duration time2, so that time2 ends at the timing of peak temperature;
d. calculating shortened compressor-on value Y for the duration time2, so that time2 ends at the timing of peak temperature;
e. comparing the value X and value Y, if X≤Y, then lengthen the compressor-on timing time2 as time2+X, or if X>Y, then shorten the compressor-on timing time2 as time2−Y; and
f. after the peak temperature has passed, restoring the normal compressor-on duration time2.

It is possible that the compressor-off timing ending being aligned with the peak temperature timing might not necessary the best solution. Person having ordinary skill in the art might find that having the midpoint of the compressor-off duration aligned with the peak temperature timing would be more attractive. It is also possible that a PHOSITA would consider more than one factor in choosing whether to lengthen or shorten time2, such as when multiple similar units are working together, it is better for them not to have the same time2. Additionally, it is possible that the outdoor temperature changes not according to the forecast, and in this case, the system should re-determine its strategy according to the actual temperature.

The invention claimed is:

1. A variable speed AC control system comprises: speed control calculation unit, database unit, an information acquisition unit, network communication unit and speed control unit, wherein
the speed control unit is for running variable speed compressor so that output is satisfied while maintaining preset thermostat setting and that next compressor-off time1 coincides with outside peak/lowest temperature timing; and
the information acquisition unit is for collecting thermostat setting and outdoor temperature; and
the database unit is for storing/providing lookup data for indoor temperature and outdoor temperature for a given compressor-off duration time1, which are needed by the speed control calculation unit; and
the network communication unit is used to obtain in advance outdoor temperature values as forecast.

2. The variable speed AC control system according to claim 1, wherein
the speed control calculation unit is for determining the timing on the outside peak temperature, and based on that timing, determining the operation cycle status at that timing, and further determining timing change of the operation cycle preceding the peak/lowest temperature, when needed, so that next compressor-off time1 coincide with the timing of the peak/lowest temperature.

3. The variable speed AC control system according to claim 2 wherein
the change of operation cycle preceding the peak/lowest temperature is based on whether overall result favors lengthening or shortening time2.

4. The variable speed AC control system according to claim 3 wherein the change of operation cycle would choose lengthening or shortening time2 based on which change to time2 is the lessor of the two.

5. The variable speed AC control system according to claim 4 wherein
the speed control strategy adjustment should produce midpoint of compressor-off duration time1 to coincide with timing of the peak/lowest outside temperature.

6. The variable speed AC control system according to claim 5 wherein
the speed control strategy adjustment should update its calculation when detecting outdoor temperature changes not according to the forecast; and
after the peak/lowest temperature has passed, restore normal compressor-on duration time2.

7. A variable speed AC control method, comprising:
receiving outdoor temperature curve as forecast;
based on the temperature curve, compressor-off duration time1 and compressor-on duration time2, determine compressor operation status at the timing of peak/lowest temperature;
further based on peak temperature timing and operation cycle timing that precedes it, modifying that operation cycle's compressor-on time2 timing as speed control strategy adjustment while maintaining preset thermostat setting so that next compressor-off time1 coincide with the timing of the peak/lowest temperature.

8. The variable speed AC control method according to claim 7, wherein
the modifying of operation cycle preceding the peak/lowest temperature is based on whether overall result favors lengthening or shortening time2.

9. The variable speed AC control method according to claim 8, wherein
the speed control strategy adjustment would choose lengthening or shortening time2 based on which change to time2 is the lessor of the two.

10. The variable speed AC control method according to claim 9, wherein
the speed control strategy adjustment should produce midpoint of compressor-off duration time1 to coincide with timing of the peak/lowest outside temperature.

11. The variable speed AC control method according to claim 10, wherein
the speed control strategy adjustment should update its calculation when detecting outdoor temperature changes not according to the forecast; and
after the peak/lowest temperature has passed, restore normal compressor-on duration time2.

12. A non-transitory computer-readable medium having stored thereon a set of computer-executable instructions for causing a first device to perform steps comprising:
receiving outdoor temperature curve as forecast;
based on the temperature curve, compressor-off duration time1 and compressor-on duration time2, determine compressor operation status at timing of peak/lowest temperature;
further based on peak temperature timing and operation cycle timing that precedes it, modifying that operation cycle's compressor-on time2 timing as speed control strategy adjustment while maintaining preset thermostat setting so that next compressor-off time1 coincide with the timing of the peak/lowest temperature.

13. The non-transitory computer-readable medium according to claim 12, wherein
the modifying of operation cycle preceding the peak/lowest temperature is based on whether overall result favors lengthening or shortening time2.

14. The non-transitory computer-readable medium according to claim 13, wherein
the speed control strategy adjustment would choose lengthening or shortening time2 based on which change to time2 is the lessor of the two.

15. The non-transitory computer-readable medium according to claim 14, wherein
the speed control strategy adjustment should produce midpoint of compressor-off duration time1 to coincide with timing of the peak/lowest outside temperature.

16. The non-transitory computer-readable medium according to claim 15, wherein
the speed control strategy adjustment should update its calculation when detecting outdoor temperature changes not according to the forecast; and
after the peak/lowest temperature has passed, restore normal compressor-on duration time2.

* * * * *